(12) United States Patent
Byzov

(10) Patent No.: US 10,482,059 B2
(45) Date of Patent: Nov. 19, 2019

(54) METHOD FOR MIGRATING A WORKLOAD, COMPUTER ARRANGEMENT AND NON-VOLATILE STORAGE MEDIUM

(71) Applicant: FUJITSU LIMITED, Kawasaki-shi, Kanagawa (JP)

(72) Inventor: Grigory Byzov, Lodz (PL)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 15/995,520

(22) Filed: Jun. 1, 2018

(65) Prior Publication Data

US 2018/0365191 A1 Dec. 20, 2018

(30) Foreign Application Priority Data

Jun. 16, 2017 (EP) ..................................... 17176403

(51) Int. Cl.
*G06F 15/173* (2006.01)
*G06F 3/06* (2006.01)
*G06F 9/4401* (2018.01)
*H04L 29/08* (2006.01)

(52) U.S. Cl.
CPC ...... *G06F 15/17331* (2013.01); *G06F 3/0604* (2013.01); *G06F 3/067* (2013.01); *G06F 3/0647* (2013.01); *G06F 9/4416* (2013.01); *H04L 67/10* (2013.01)

(58) Field of Classification Search
CPC ............. G06F 15/17331; G06F 3/0604; G06F 3/0647; G06F 9/4856
See application file for complete search history.

(56) References Cited

U.S. PATENT DOCUMENTS

| 10,326,826 | B1* | 6/2019 | Fitzgerald | ............... H04L 67/10 |
| 2004/0039829 | A1* | 2/2004 | Bucher | ................. H04L 63/083 |
| | | | | 709/229 |
| 2006/0234623 | A1 | 10/2006 | Wallis et al. | |
| 2012/0303799 | A1 | 11/2012 | Hadas et al. | |
| 2013/0198137 | A1 | 8/2013 | Miller et al. | |
| 2015/0096011 | A1* | 4/2015 | Watt | ..................... H04L 63/0272 |
| | | | | 726/15 |
| 2017/0339225 | A1* | 11/2017 | Vasetsky | ............. G06F 12/0862 |

* cited by examiner

*Primary Examiner* — Bryan Lee
(74) *Attorney, Agent, or Firm* — Fujitsu Patent Center

(57) ABSTRACT

A method for migrating a workload from a first to a second computer system. The first computer system initiates a first data link from the first to a third computer system and the second computer system initiates a second data link from the second to the third computer system. The first computer system reads the workload to be migrated on a block device level from a first storage device of the first computer system, divides the workload to be migrated into data blocks of a predefined size and uploads data corresponding to the data blocks to the third computer system. The second computer system downloads data corresponding to the data blocks from the third computer system and writes the data blocks to a second storage device of the second computer system, such that an identical copy of the workload to be migrated from the first computer system is created.

17 Claims, 4 Drawing Sheets

Figure 1:
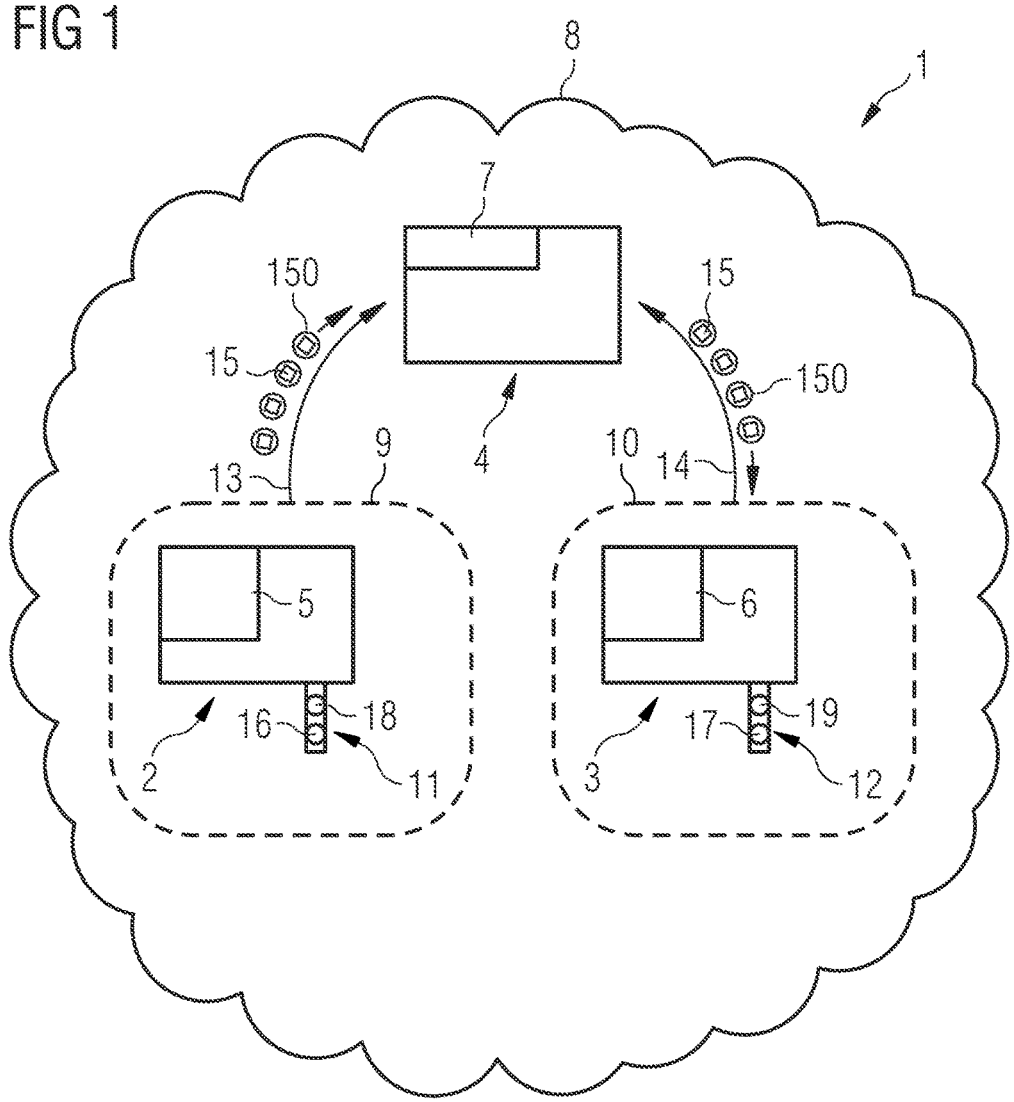

METHOD FOR MIGRATING A WORKLOAD, COMPUTER ARRANGEMENT AND NON-VOLATILE STORAGE MEDIUM

The invention relates to a method for migrating a workload from a first computer system to a second computer system. The invention further relates to a computer arrangement comprising a first computer system and a second computer system and to a non-volatile storage medium.

Migrating a workload from a first computer system to a second computer system is a common process in computer related workflows. To migrate a workload, partitions and/or disk images comprising data and/or an operating system and/or applications stored on the first computer system are transferred to the second computer system. Such workload migrations are usually performed using a data network. Since the amount of data of such a workload can be very high, the migration via the data network can be extremely time-consuming. Furthermore, the migration of a workload via an unstable network can require a high amount of effort since every disruption in the data transfer may cause the whole migration to be started again from the beginning.

An object of the present invention is to provide a method for migrating a workload from a first computer system to a second computer system, as well as a computer arrangement and a non-volatile storage medium configured to perform such method.

According to a first aspect of the invention, a method for migrating a workload from a first computer system to a second computer system is disclosed, wherein the first and the second computer system are connected to a data network. The method comprises setting up a first data link via the data network from the first computer system to a third computer system and a second data link from the second computer system to the third computer system, wherein the first and the second data link are initiated by the first and the second computer system, respectively. The first computer system reads the workload to be migrated on a block device level from a first storage device of the first computer system. The first computer system further divides the workload to be migrated into a plurality of data blocks of a predefined size and sequentially uploads data corresponding to the plurality of data blocks from the first computer system via the first data link to the third computer system. The second computer system downloads data corresponding to the plurality of data blocks from the third computer system and writes the plurality of data blocks to a second storage device of the second computer system, such that an identical copy of the workload to be migrated from the first computer system is created.

An advantage of the first data link being initiated by the first computer system and the second data link being initiated by the second computer system is that, if the first computer system and/or the second computer system are protected by a network security system such as a firewall, sending data from one of the computer systems is normally permitted, wherein receiving data from another computer system normally is prohibited by the firewall. Similar problems which are avoided by this implementation can be caused by routers, gateways, network address translation, NAT, and proxy servers. The method may be performed independently of network security systems and network structures. For example, the first and the second computer system may be located in any kind of real or virtual data network. Also, they may be located in the same network or in different networks which are connected to an interconnecting network, such as the Internet.

An advantage of reading the workload to be migrated on the block device level from the first storage device is that the migration of the workload is independent of an operating system and a file system of the first computer system. As long as the first storage device is storing data based on bytes, all operating systems and all file systems, including, for example, a logical volume manager or encrypted and hidden partitions, can be migrated.

Dividing the workload into a plurality of data blocks results in several advantages. Firstly, migrating the whole workload can be split into several sessions. Those sessions can be started, stopped and continued whenever convenient for a user. For example, the whole migration process may only be conducted in several sessions at night time, when network occupation is generally low. Secondly, in case an unstable network is used for migration, the migration process can be continued with data corresponding to the data block, during whose transmission the network failed. It is therefore not necessary to start the whole migration process from the beginning. Furthermore, dividing the workload into data blocks allows an independent processing of each data block. Therefore, processing power and temporary memory requirements are optimized, data integrity checks are accelerated and disk and network errors are manageable.

In at least one embodiment of the invention, the method comprises booting the first computer system from a first boot medium. The first boot medium comprises a first auxiliary operating system and executable program code to set up the first data link, to read the workload to be migrated, to divide the workload into the plurality of data blocks and to sequentially upload data corresponding to the plurality of data blocks from the first computer system to the third computer system. Alternatively or in addition, the method comprises booting the second computer system from a second boot medium. The second boot medium comprises a second auxiliary operating system and executable program code to set up a second data link, to download data corresponding to the plurality of data blocks from the third computer system and to write the plurality of data blocks to the second storage device.

An advantage of booting the first computer system and/or the second computer system from a first boot medium and a second boot medium comprising a first and a second auxiliary operating system, respectively, is that the migration process can be started and performed independently from any main operating system being installed on the first computer system and the second computer system. In case the second storage device is empty at the beginning of the migration process and no main operating system is installed on the second computer system, the second boot medium is needed to start the second computer system at all. Furthermore, no special user permission in the main operating system of the first computer system needs to be created to permit the migration process. Additionally, in this embodiment, firewalls installed in the main operating systems of the first and the second computer, which may interfere with setting up connections, are avoided.

Another advantage of the auxiliary operating systems is that only one license, development effort, training and troubleshooting for the auxiliary operating system is needed instead of a solution with different programs for different operating systems. Time consumed for maintenance and training and, therefore costs, can be reduced.

In at least one embodiment of the present invention, the predefined size of the plurality of data blocks is determined based on a quality of the first data link and/or the second data link. In at least one alternative embodiment, the predefined size of the plurality of data blocks is provided by the user.

An advantage of the size of the data blocks being related to the quality of the first and/or the second data link is that the process of migration may be optimally adjusted to the quality of the network. If the network is rather unstable, data blocks of smaller size and therefore higher granularity can be advantageous. In case of a disruption of the network less time is wasted when data corresponding to the data block, during whose transmission the network failed, has to be re-uploaded. If, however, the network is rather stable, bigger data blocks may be advantageous, because further processing of the data blocks as described below can be done faster and data block overhead can be reduced.

In at least one embodiment of the invention, the method further comprises the step of creating, by the first computer system, a compressibility map of the workload to be migrated, wherein an order of uploading data corresponding to the plurality of data blocks is determined by said compressibility map.

Such a compressibility map may, for example, comprise information about a compressibility of each data block and where empty data blocks are located in the workload. With such a compressibility map, the order of uploading data corresponding to the data blocks can be arranged in such way, for example, that data corresponding to empty data blocks and well-compressed data blocks is uploaded first and data corresponding to data blocks with a worse compression ratio is uploaded after. Alternatively, empty data blocks can also be omitted in the migration process. Another order dependent on such a compressibility map may be, for example, that data corresponding to better compressed data blocks is uploaded during the day to consume less network resources whereas data corresponding to data blocks with a worse compression ratio is uploaded at night. Such a compressibility map may furthermore provide a better prediction of how long migrating the whole workload will take.

In at least one embodiment of the invention, the method further comprises the step of intermediately storing data corresponding to the plurality of data blocks on a non-volatile third storage device of the third computer system before downloading data corresponding to the data blocks by the second computer system.

Storing data corresponding to the plurality of data blocks intermediately on a non-volatile third storage device may be advantageous in case the first data link and the second data link exhibit varying transmission rates and/or stability. Especially if the second data link has a lower transmission rate than the first data link, the data corresponding to the data blocks may wait on the third computer system before being downloaded by the second computer system. In case the second data link is disrupted, intermediately storing data corresponding to the data blocks on a non-volatile third storage device of the third computer system has the advantage that the interruption of the second data link does not interfere with uploading data corresponding to the data blocks from the first computer system to the third computer system. Storing the data corresponding to the data blocks on the non-volatile third storage device allows the third computer system to intermediately store a high quantity of data, depending on the capacity of the non-volatile third storage device. It may be advantageous for big deployments in enterprises with big workloads to be migrated and wherein many workloads shall be migrated at the same time. Alternatively, the third computer system can be configured to only store data corresponding to a single or a few data blocks at a time in order to consume less storage resources.

In at least one embodiment, the workload is migrated from the first computer system to the second computer system without intermediately storing data corresponding to the data blocks on a non-volatile third storage device of the third computer system.

Forwarding data corresponding to the data blocks without intermediately storing the data on a non-volatile third storage device of the third computer system has the advantage that no non-volatile storage is required at the third computer system. In this embodiment, data corresponding to the data blocks is stored in a volatile memory of the third computer system, such as RAM, before data corresponding to the data blocks is downloaded by the second computer system.

The arrangement of first, second and third computer system herein resembles a client-queue-client, CQC, or passive client system, in which the third computer system is a data queue for the first and second computer system. Data corresponding to the data blocks may be stored only for a very short time, e.g. only a fraction of a second, in a volatile memory of the third computer system. However, if the second data link is interrupted, data corresponding to the data blocks may be stored in a volatile memory of the third computer system until the second data link is restored. The volatile memory of the third computer system can intermediately store as much data corresponding to data blocks at the same time, as the capacity of the volatile memory allows or can be configured to only store data corresponding to a single or a few data blocks at a time in order to consume less memory resources. Alternatively, data corresponding to one or more data blocks which is intermediately stored in the volatile memory of the third computer system may be discarded from the volatile memory after a certain time if it cannot be downloaded by the second computer system. In that case, the first computer system will re-upload data corresponding to the one or more data blocks which was discarded from the volatile memory of the third computer system when the second data link is restored to resume the migration process from the point where it was interrupted.

According to a second aspect of the invention, a computer arrangement comprising a first computer system, a second computer system and a third computer system is disclosed. The first computer system, the second computer system and the third computer system are connected to a data network. The first computer system is arranged to set up a first data link via the data network to the third computer system and to read a workload to be migrated on a block device level from a first storage device of the first computer system. The first computer system is further arranged to divide the workload to be migrated into a plurality of data blocks of a predefined size and to sequentially upload data corresponding to the plurality of data blocks from the first computer system via the first data link to the third computer system. The second computer system is arranged to set up a second data link via the data network to the third computer system, to download data corresponding to the plurality of data blocks from the third computer system to the second computer system via the second data link and to write the plurality of data blocks to a second storage device of the second computer system such that an identical copy of the workload to be migrated from the first computer system is created.

In at least one embodiment, the third computer system of the computer arrangement is a web server processing requests received from the first computer system and the second computer system via hypertext transfer protocol, HTTP, and the third computer system listens on port 80 for requests sent by the first computer system and the second computer system.

Usually, at least three ports are in use in each communication via HTTP. One port on the first computer system (respectively the second computer system) and two ports on the web server (i.e. the third computer system). Important for establishing a data link between the first (respectively the second) computer system and the third computer system is the listening port. The remaining two ports are randomly selected during negotiation of the communication protocol and can receive any available port number like 53819 or 48256 etc. The port, which enables starting the communication via HTTP, is the listening port and has the port number 80 on the third computer system.

An advantage of the third computer being a web server which processes requests received from the first computer system and the second computer system via HTTP is that communication via such protocol is usually permitted for computer systems in a secured environment. Corporate networks usually have complex structures with several subnets. Due to firewalls and NAT, it may be impossible for a first computer system inside such a complex structure to be visible for a second computer system from an external data network. Establishing a point-to-point, PtP, connection between first and second computer system in that case would require setting explicit port-forwarding rules for a high number of routers of the complex network. Each router modification would require requests, decisions, approvals to and from an administrator and documentation updates, etc. Communication between the first and second computer system and the third computer system via HTTP for migrating the workload avoids all above mentioned problems. Also, if the first and/or the second computer system are secured by a firewall which does not permit, for example, data transfer via peer to peer networking, P2P, the migration process can anyway be conducted without requiring any special permission. Creating special permissions to permit data transfers through a firewall always creates an insecurity in the firewall and therefore is always combined with risk, extra costs and additional expenditure of time.

According to a third aspect of the invention, a non-volatile storage medium is disclosed, the storage medium comprising computer program code which, when executed by at least one processing device of at least one of the first computer system, the second computer system or the third computer system, performs the steps of at least one of the first computer system, the second computer system or the third computer system, respectively, according to the method mentioned above.

Further advantageous embodiments of the invention are disclosed in the attached claims as well as the following detailed description of exemplary embodiments. The exemplary embodiments are described with respect to the attached figures.

In the figures:

FIG. 1 shows a schematic drawing of a computer arrangement according to an embodiment of the invention; and FIGS. 2-7 show flowcharts of a method for migrating a workload from a first computer system to a second computer system.

FIG. 1 shows a schematic drawing of a computer arrangement 1 according to an embodiment of the invention. The computer arrangement 1 comprises a first computer system 2, a second computer system 3 and a third computer system 4.

In this embodiment the first and the second computer system are desktop computers, comprising a first storage device 5 and a second storage device 6, respectively. However, first computer system 2 and second computer system 3 could be any kind of computer system, such as servers, work stations, virtual machines, cloud instances, etc. In the following, for clarity reasons, a distinction is made between a user of the first computer system 2, a user of the second computer system 3 and a user of the third computer system 4. However, it is possible of course, that all three computer systems 2, 3, 4 are controlled by the same user, especially in case the first and the second computer system 2, 3 or all three of them are located in the same local area network.

In this embodiment, the third computer system 4 is a web server comprising a non-volatile third storage device 7. However, the third computer system 4 may also be implemented without a non-volatile third storage device 7 and may be any kind of a physical or virtual computer system.

First computer system 2, second computer system 3 and third computer system 4 are connected to a data network, in this embodiment the Internet 8. First computer system 2 and second computer system 3 are protected by a first firewall 9 and a second firewall 10, respectively. First firewall 9 and second firewall 10 may be, for example, firewalls of local area networks, in which the first computer system 2 and the second computer system 3 are located. In another embodiment, first computer system 2 and second computer system 3 may be located in the same or separate wide area networks (WAN), local area networks (LAN), metropolitan area networks (MAN), personal area networks (PAN), virtual private networks (VPN), enterprise private networks (EPN), intranets, extranets or ad-hoc networks, etc., which then are connected to the Internet 8 in which the third computer system 4 is located. It may also be possible that all three computer systems 2, 3, 4 are all located in the same WAN, LAN, MAN, PAN, VPN, EPN, intranet, extranet or ad-hoc network, etc. In general, any constellation of first, second and third computer system 2, 3, 4 is possible, as long as a Transmission Control Protocol/Internet Protocol (TCP/IP) link between the first and the third computer system 2, 4, as well as between the second and the third computer system 3, 4 can be arranged.

FIG. 1 further shows a first boot medium 11 and a second boot medium 12, connected to the first computer system 2 and the second computer system 3, respectively. In this embodiment, first boot medium 11 and second boot medium 12 are memory sticks from which the computer systems 2, 3 can be booted. In other embodiments, the first boot medium 11 and/or the second boot medium 12 may also be bootable disks such as a CD or DVD, an ISO image or a cloud image.

In this embodiment, the workload to be migrated from the first computer system 2 to the second computer system 3 comprises the whole content and file system structure stored on the first storage device 5. According to the invention, an identical copy of the data of the first storage device 5 shall be copied to the second storage device 6. The second storage device 6 of the second computer system 3 is empty at the beginning of the migration process. Alternatively, on the second storage device 6, data may be stored and a second main operating system may be installed, which shall be overwritten with data and a first main operating system from the first computer system 2. In that case, the first main operating system of the first computer system 2 may be different from the second main operating system installed on the second computer system 3. Also in that case, at the start of the migration, file systems of the first storage device 5 and the second storage device 6 may be different.

The first boot medium 11 comprises a first auxiliary operating system 16, which is executed on the first computer system 2 when booted from the first boot medium 11. The second boot medium 12 comprises a second auxiliary operating system 17 similar to the first auxiliary operating system 16, executed on the second computer system 3 when booted from the second boot medium 12. Booting the first auxiliary operating systems 16 from the first boot medium 11 makes the workload migration independent of the first main operating system on the first computer system 2.

Booting the second auxiliary operating system 17 from the second boot medium 12 allows a user of the second computer system 3 to set up the empty second computer system 3 for the migration process. Furthermore, no special permission for workload migrations is needed for the installed first main operating system to allow a user of the first computer system to perform the migration. The similarity of the first and the second auxiliary operating system 16, 17 makes it easier for a user to learn and understand than having to use different solutions for different operating systems on the first and second computer system 2, 3. Also a user, who performs migration processes from different first computer systems 2 on which different first main operating systems are installed does not need to use different migration applications for every first main operating system.

In this embodiment, the first and second auxiliary operating systems 16, 17 are rather simple Unix-like operating systems, such as small Linux operating systems, comprising not more than 30 Megabytes of executable program code stored on the first and the second boot medium 11, 12, respectively. In this embodiment, the first and second boot medium 11, 12 comprise each a 10 Megabyte Linux operating system including kernel, drivers and a Unix shell, an 18 Megabyte all-in-one PHP executable and a 1 Megabyte migration application for the first and the second computer system 2, 3, respectively, executed by PHP engine.

The first boot medium 11 and the second boot medium 12 each comprise besides the auxiliary operating systems 16, 17 further executable program code to set up a first data link 13 and a second data link 14 from the first computer system 2 and the second computer system 3 to the third computer system 4, respectively. The first data link 13 from the first computer system 2 to the third computer system 4 is initiated by the first computer system 2 and connects the first to the third computer system 2, 4 via the Internet 8. In this embodiment, the first and the second data link 13, 14 are stateless data links. All communications of the first and the second computer system 2, 3 with the third computer system 4 are performed via hypertext transfer protocol, HTTP, as explained in detail with respect to FIG. 2. Therefore, for every exchange of data or information between the first or the second computer system 2, 3 and the third computer system 4, a separate first or second data link 13, 14, respectively, is set up.

The first boot medium 11 further comprises a reader software 18, which can be executed by the first computer system 2. When executed, the reader software 18 reads, by the first computer system 2, the workload to be migrated on a block device level. The block device level provides access to data, stored on the first storage device 5, on a lower level than the file system of said storage device 5. The block device level is based on the basic concept of bytes containing the stored information and reading those bytes on a block device level means reading each byte consecutively and independently from the surface of the storage device 5. Block device level access enables the first computer system 2 to directly read the entire physical hardware disk which underlies actual partitions, file systems and everything contained in them. In case of virtual or cloud environments, hardware disks are emulated.

The entire first storage device 5 is presented to the first auxiliary system 16 and the reader software 18 as a single uninterrupted first binary file whose size is equal to the size of the entire first storage device 5. For example, if the first storage device 5 comprises an 80 Gigabytes disk, it would be presented as a first binary file of 80 Gigabytes (85 899 345 920 bytes), without any indication of partition boundaries, types of file systems, or even whether there is any file system present or not. This entire first binary file shall be copied from the first computer system 2 to the second computer system 3.

Block device level access, as described above, guarantees that all (known/unknown/meaningful/meaningless) details of the first storage device 5 will be identically recreated in the second storage device 6. These details can include partition layout, file systems, one or more operating systems, encrypted files and partitions, installed software and licenses, security settings, even forensic artifacts and all other noise scattered over areas unused by the system. The actual meaning of all these bytes is not important for the migration process. Block device level access is advantageous because it enables using one universal copying mechanism for any and all possible types of storage contents. Those bytes only need to be written in the exact same order onto the second storage device 6 on the second computer system 3, to create an identical copy.

The reader software 18, when executed by the first computer system 2, further divides the workload into data blocks 15 of a predefined size while reading. As the workload, which shall be migrated, is usually enormous (as mentioned above, in this example a file of 80 Gigabytes) for a network transfer, it is advantageous to divide it into many small data blocks 15 and copy these data blocks 15 individually, one by one.

A data block 15 is retrieved from this enormous file by the reader software 18 by reading with an offset. The reader software 18 goes to a byte number X and from that point the reader software 18 reads Y number of bytes. As a result, the data block which was read contains Y number of bytes, and additionally is associated with information that its beginning should correspond to the point where byte number X is located. Such information is for example stored in a header. The reader software 18 combines each data block 15 with a corresponding header to create data 150 corresponding to the data block 15 which is uploaded to the third computer system 4. In this embodiment, always one data block 15 is processed individually by the first computer system 2 to create said data 150 to be uploaded. However, it would also be possible to combine several data blocks 15 to be uploaded together as data 150, e.g. in order to reduce data overhead.

Such headers are specific to the above described communication between the third computer system 4 and the first computer system 2, respectively the second computer system 3, realized within HTTP. The purpose of the headers is to enable a way of accounting of the migration process and ensure integrity and completeness of the migrated data. This communication constitutes a small transmission overhead (e.g. 0.008% for data blocks 15 of 8 Megabytes, lower for bigger blocks). This data overhead is rather small and usually can't be made much smaller. It is important to also reduce run-time overhead, which is, for example, used for establishing each new data link, before data transfer begins.

If many data blocks are sent using one established data link 13, 14, time savings are visible, especially on high-latency networks like Global System for Mobile Communication, GSM, standard or long distance international links.

The size of the data blocks 15 can be chosen by a user of the third computer system 4, who performs the migration process. Further detail regarding the data block size of the data blocks 15 is described with respect to FIG. 2. The reader software 18 loads the data blocks 15 into main memory of the first computer system 2 and compresses and encrypts the data blocks 15 by the first computer system 2. Therefore, in this embodiment, each data 150 to be uploaded comprises one compressed and encrypted data block 15. Software for implementing the encryption process is comprised in the reader software 18. Encryption of the data blocks 15 is described in more detail with respect to FIG. 2 and FIG. 5.

The data 150 corresponding to the data blocks 15 is uploaded from the first computer system 2 to the third computer system 4 via the first data link 13. The third computer system 4 does not have a key for decryption of the encrypted data blocks 15. Therefore a content of the data blocks 15 cannot be read by the third computer system 4 or any intermediate computer system on the Internet 8. The third computer system 4 implements a hub-service for forwarding the data 150 corresponding to the data blocks 15 so that the second computer system 3 is able to download the data 150 via the second data link 14 as described later. In case any interruption occurs on the second data link 14, or the second data link 14 has a lower transmission rate than the first data link 13, optionally, the data 150 corresponding to data blocks 15 can be stored intermediately on the non-volatile third storage device 7 of the third computer system 4. However, access to the content of the data blocks 15 is neither possible nor needed from the third computer system 4.

The second boot medium 12 comprises executable program code, executed by the second computer system 3, to set up the second data link 14. The second data link 14 is initiated by the second computer system 3 to connect the second computer system 3 to the third computer system 4 via the Internet 8. As mentioned before, also the second data link 14 is stateless. The second boot medium 12 further comprises a writer software 19 for downloading the data 150 corresponding to the data blocks 15 and writing the data blocks 15 onto the second storage device 6 of the second computer system 3 on block device level. The writer software 19 executed on the second computer system 3 decrypts and decompresses the data 150 to retrieve the data blocks 15. Software for implementing the decryption process is comprised in the writer software 19. Decryption of the data 150 is described in more detail with respect to FIG. 2 and FIG. 7.

To write the data blocks 15 to the second storage device 6 on block device level, the writer software 19 sees the entire second storage device 6 as a second binary file. The data blocks 15, received by the second computer system 3, are then positioned into this second binary file by the writer software 19 by writing with an offset. For example for the data block 15, which is associated with information that its beginning should correspond to the point where byte number X is located, the writer software 19 goes to the location of byte number X and from that point it writes Y number of bytes. Values X and Y are taken from the header, combined with the uploaded data block 15. As a result, starting from location X in the second binary file, Y number of bytes appear, and contents of these Y bytes are identical to contents of Y bytes at the location X in the first binary file seen by the reader software 18 on the first storage device 5. In other words, a byte at byte number X on the first storage device 5 is identical to a byte at byte number X on the second storage device 6, a byte at byte number X+1 on the first storage device 5 is identical to a byte at byte number X+1 on the second storage device 6, etc.

Reading and dividing the first binary file into the data blocks 15 by the reader software 18 and writing them by the writer software 19 is repeated for the length of the entire first binary file. The first and second binary file, as seen by the reader and the writer software 18, 19, are directly connected to the surfaces of the first and second storage device 5, 6, respectively. All information comprised on the first storage device 5 has been copied entirely into the second storage device 6 as soon as all parts of the first binary file have been copied into the second binary file.

In case that a higher performance for the hub-service is needed, or a network speed shall be load-balanced, the hub-service may be executed on any virtual or physical machine. In order to deploy the hub-service, a third boot medium, not shown in FIG. 1, is used to start the hub-service on any virtual or physical machine. The hub-service then runs entirely in main memory of said virtual or physical machine such that original contents of a storage device of the virtual or physical machine are unaffected. After the workload migration is finished and the hub-service is no longer needed, the virtual or physical machine can be restored to its original state by restarting the virtual or physical machine without the third boot medium.

Alternatively, the hub-service of the third computer system 4 can be deployed for example into any existing PHP hosting space. A package comprising all information for this service can be uploaded using, for example, file transfer protocol, FTP, in order to implement the third computer system on said PHP hosting space. However, any other means for uploading the package can be used as well. In the described embodiment, said package has a size of not more than 10 Megabyte. For example, in the embodiment of FIG. 1, said package includes 1.2 Megabytes of executable program code for a backend of the hub-service, which performs the migration process and 4.2 Megabytes of executable program code for a frontend for the hub-service, which comprises a web-based graphical user interface, web GUI, furtherly described with respect to FIG. 2. However, according to the invention, one frontend can control multiple backends, therefore the deployment of the frontend is optional. Only access to at least one frontend is required, which may be deployed anywhere and which can reach port 80 of the server which has the backend running on it. The frontend is implementable for example solely with HTML and JavaScript.

Since the third computer system 4 only forwards the data 150 corresponding to the data blocks 15, all CPU-intensive work in the migration process according to the method is done by the first computer system 2 and the second computer system 3. Accordingly, the third computer system 4 can be used as a hub for several concurrent migrations per each CPU or CPU-core of the third computer system 4 at the same time.

Figure 2:
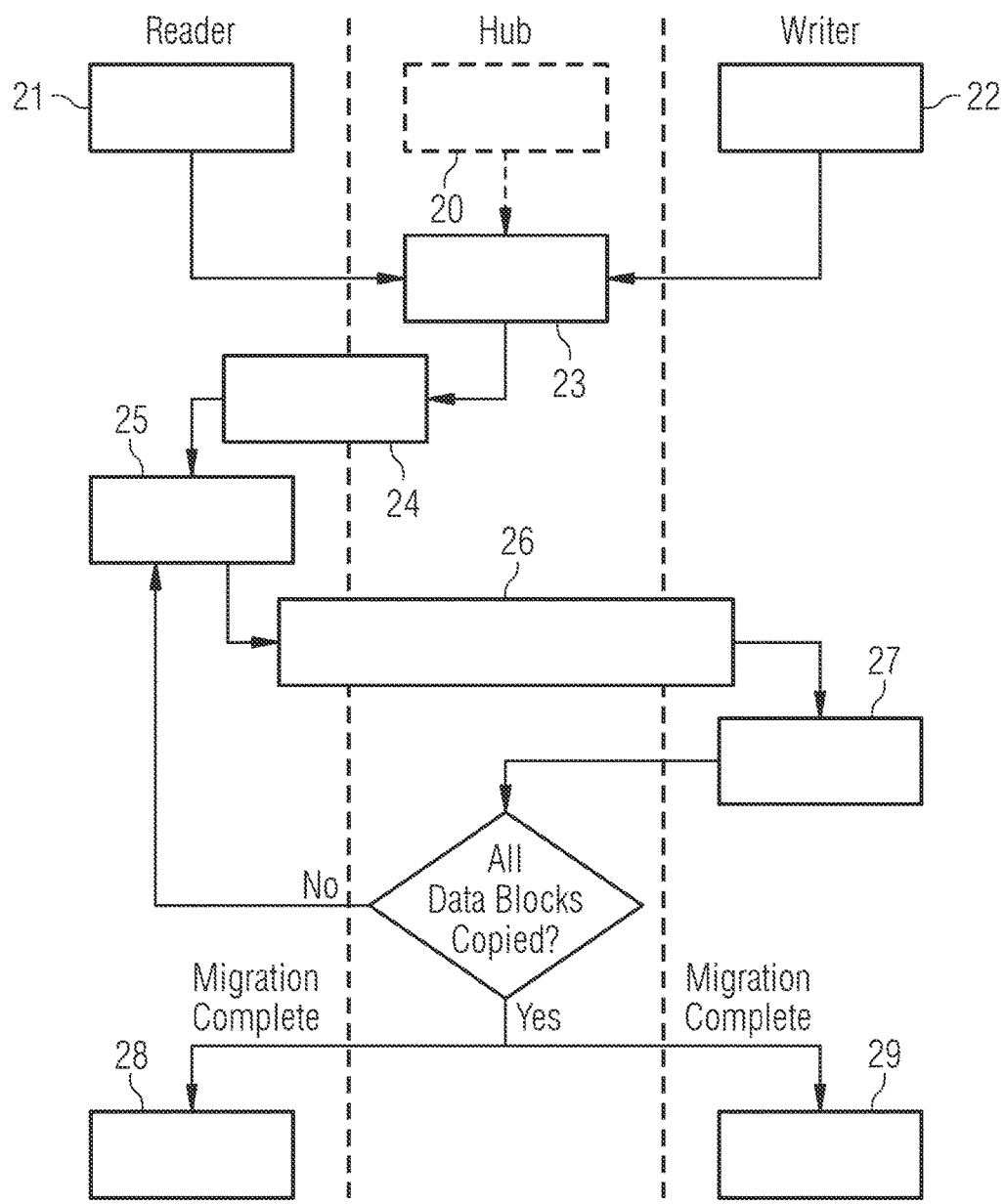

FIGS. 2 to 7 show flowcharts of a method for migration according to one embodiment of the invention. FIG. 2 shows an overview of the method and FIGS. 3 to 7 show several steps of FIG. 2 in more detail. The method according to FIGS. 2 to 7 may be applied to the computer arrangement 1 of FIG. 1. All references made with respect to the embodiment of FIGS. 2 to 7 may therefore be applicable to the embodiment of FIG. 1 and vice versa.

In step 20 of FIG. 2, the third computer system 4 is set up as a hub for workload migration by booting the third computer system 4 from the third boot medium. Step 20 of the flowchart according to FIG. 2 is optional. As hub, also a pre-configured third computer system providing a web server can be used. The hub can be accessed via the Internet 8 through a web-based graphical user interface, web GUI. While setting up the hub, for example login data for the first computer system 2 and for the second computer system 3 such as a username and a password are created and stored in a login/password database of the hub. Those login data are used by a reader software 18 running on the first computer system 2 and a writer software 19 running on the second computer system 3 to access the hub over the first data link 13, respectively the second data link 14.

The data links 13, 14 provide a network path from the first computer system 2 and the second computer system 3 to the hub, but only requests made by the first, respectively the second computer system 2, 3 with those login data will be answered by the hub. If the first and/or the second computer system 2, 3 have wrong login data, the hub will not respond to their requests. Such implementation of communication via requests from the first and the second computer system 2, 3 using login data enables multi-tenancy in the hub. The login data are used for differentiating between multiple readers and writers connected to the hub at the same time. The login data are independent from main operating systems being installed on the first computer system 2 and, if applicable, on the second computer system 3. If the hub is pre-configured, such login data may already exist on the hub or may be created on the hub at any later time using the web GUI. For example, new login data may be created, whenever a new workload migration is planned.

In step 21, the first computer system 2 is set up as a reader and the first data link 13 is set up for migration, in step 22, the second computer system 3 is set up as a writer and the second data link 14 is set up for migration. Both steps 21, 22 are described in more detail with respect to FIGS. 3 and 4, respectively.

In a subsequent step 23, a user of the third computer system 4 accesses the hub via a web browser and chooses the workload which he wants to migrate if setting up the first data link 13 and the second data link 14 was successful. In this embodiment, a web browser to access the hub may be accessed via any computer system connected to the Internet 8. The reader sends to the hub information about the reader's storage device 5, including its disks, which is displayed on the web GUI of the hub so the user of the third computer system 4 can choose the workload he wants to migrate.

Additionally, the user of the third computer system 4 can select a buffer size, encryption mode, compression level and data block size of the data blocks 15 through the web GUI of the hub. The buffer size is space allocated in the non-volatile third storage device 7, or in the volatile storage of the third computer system 4, for intermediately storing the data blocks 15.

Encryption can be turned on and off, depending on the security level of the network, which is used for the migration process. For example, if the network is secure, encryption can be turned off to shorten migration time by decreasing the amount of CPU processing of the first and the second computer system 2, 3. Secure networks are in this context such networks, where the reader, hub, writer and links between them are protected from unauthorized access, for example an isolated subnet of an internal maintenance LAN in a data-center.

A better compression level compresses the data blocks with a better compression ratio. Transferring better compressed data blocks consumes less time and network resources, however, computational resources such as time and electricity are consumed in the compression process.

The data block size can be chosen manually in the described embodiment. Technically, a minimum size of one byte may be chosen, however, it may be advantageous to offer only options starting from one Megabyte as a minimum block size.

In step 24, the hub requests from the reader to start the migration of the chosen workload. To initiate the request, the reader continuously inquires instructions from the hub via HTTP. Each inquiry is done by the reader by setting up a first data link 13 by emulating a so called "form submission by POST method", as described in detail with respect to FIG. 3. The reader continuously accesses the hub via HTTP. In this embodiment, all instructions for the migration process are provided by the hub. However, in order to deliver the instructions to the reader, the reader continuously sends instruction requests to the hub. The hub itself has no means to contact the reader in this embodiment. For a firewall or other network security, this communication via HTTP between hub and reader resembles a normal access to a web page. Therefore, no alteration of the network security is needed to permit the migration.

Figure 5:
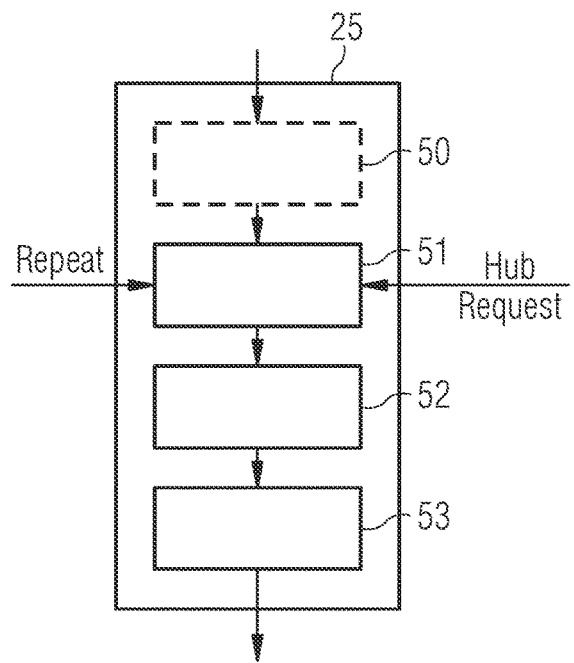

In step 25, the first computer system 2 reads the workload to be migrated into data blocks 15 on block device level and processes those data blocks 15, as described in more detail with respect to FIG. 5. In step 26, data 150 corresponding to the data blocks 15 as described in FIG. 1 are uploaded to the third computer system 4, made available by the third computer system 4 for downloading by the second computer system 3 and downloaded by the second computer system 3, described in more detail with respect to FIG. 6. In step 27, the data 150 is processed by the second computer system 3 to retrieve data blocks 15 and those data blocks 15 are written to the second storage device 6 on block device level as furtherly described with respect to FIG. 7.

Steps 25 to 27 are performed repeatedly until all data blocks 15 were copied to the writer. Whether all data blocks 15 were copied to the writer is decided by the hub, based on the confirmations, received from the writer, as described below in FIG. 7. When the hub determines that all data blocks 15 were successfully downloaded and written by the writer, the hub provides a "migration complete" signal to the reader and the writer. Some or parts of the steps 25 to 27 may also be performed simultaneously. In general, as soon as data 150 corresponding to a first data block 15 is uploaded from the reader to the hub, the reader loads a second data block 15 and processes it while the data 150 corresponding to the first data block 15 is downloaded and the first data block 15 is written to the second storage device 6 by the writer.

In case multiple first and multiple second storage devices are installed in the first and the second computer system 2, 3, respectively, after the migration of a workload from one storage device is finished, the process is switched to the next storage device. The entire process according to the above described method is repeated, until migration of all workloads of the multiple storage devices are finished. A user of the third computer system 4 can select in the web GUI, which storage devices to migrate and which to omit.

Additionally, the web GUI allows "pairing" storage devices between the first and the second computer system 2, 3: Normally migration is done from a first storage device A to a second storage device A, from a first storage device B to a second storage device B, and from a first storage device C to a second storage device C, etc. "Pairing" storage devices allows the user of the third computer system 4 to choose to migrate e.g. from a first storage device A to a second storage device B, from a first storage device B to a second storage device C, and from a first storage device C to a second storage device A, or to omit storage device C entirely. This feature may be advantageous, if sizes or cabling of the first and second storage devices 5, 6 may not identically correspond between the first and the second computer systems 2, 3. The user of the third computer system 4 can decide to change the order of storage devices in the workload without the need to reconfigure or rebuild the hardware of the second computer system 3, if, for example, it was built incorrectly or altered due to some limitations.

After all data blocks 15 are written to the second storage device 6, in steps 28 and 29, the first computer system 2 and the second computer system 3 are rebooted without the boot media 11, 12.

After rebooting the first computer system 2, the first computer system 2 is in its original state. No modifications were performed to the first computer system 2 in order to extract and transmit the workload. The second computer system 3 now comprises on the second storage device 6 an identical copy of the data of the first storage device 5 of the first computer system 2 including a copy of the main operating system installed on the first computer system 2. If any modifications are needed to prepare the cloned system for operation in the second computer system 3 (e.g. new hardware drivers), those modifications are performed on the second computer system 3. Alternatively, such modifications may also be performed on the first computer system 2, depending on a user's needs and a resulting migration plan.

If during the process of migration, certain parts of the workload to be migrated were modified on the source system (i.e. the first computer system 2), the destination system (i.e. the second computer system 3) will be quickly updated by re-migrating the lowest possible number of data blocks 15. Such modification may include for example new database records, new logs, new software/updates installed, etc. Such modifications of the workload to be migrated may occur, if the migration is interrupted, the first computer system 2 booted again with its main operating system before the migration is completed and the migration is continued at a later moment. In this case, the first computer system 2 performs everyday operations between migration sessions and therefore can be exposed to above mentioned modifications.

In order to detect such changes to the first computer system 2 when resuming the migration, a check, whether the workload to be migrated on the first computer system 2 was exposed to any modification, may be triggered manually by the user of the third computer system 4 through the web GUI on the hub. For example, the web GUI may show a message to the user of the third computer system 4, that such a check might be needed when a migration process is resumed. For example, if the migration process is divided into several sessions, it may be sufficient to run all sessions without a check for such modification and perform a final check, after the last session was completed, to eliminate all differences between the workload to be migrated on the first computer system 2 and the cloned workload on the second computer system 3. Alternatively it would be possible to implement an automatic check if a workload migration was interrupted and is resumed at a later moment. Such automatic check may be performed every time the migration resumes or after the hub determines that all data blocks 15 were successfully migrated.

Above described check for modification is done by creating a fingerprint-map of the data blocks 15 on both the reader and the writer. Those fingerprint-maps are sent to the hub for comparison. The fingerprint-map for example has similar contents to the compressibility map, described in detail with respect to FIG. 5, but instead of compression ratios, it holds fingerprints for each data block 15. Such fingerprint, for example, is calculated by a hash function which reduces each data block 15 to a string of only a few bytes. For example, a data block 15 of a size of 8 Megabytes may be reduced to a unique string of 16 Bytes. Therefore, a size of the fingerprint map for uploading the fingerprint map to the hub is optimally reduced. Differences in the fingerprint-maps from the reader and the writer are identified and the hub creates a plan of which data blocks 15 shall be requested again from the reader, according to a mismatch in the fingerprint-maps. Accordingly, steps 25 to 27 are repeated, according to the above described method.

In the following, steps 21, 22, 25, 26 and 27 are described in more detail according to FIGS. 3, 4, 5, 6 and 7, respectively.

Figure 3:
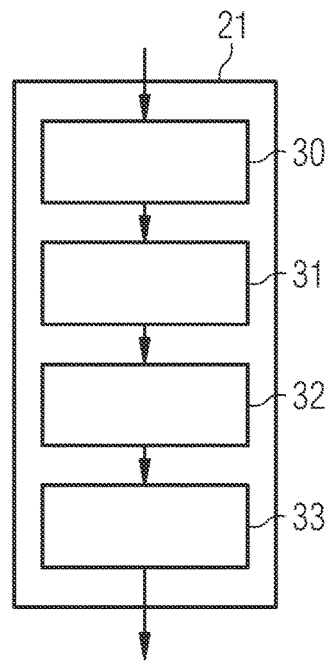

FIG. 3 is a flowchart of setting up the first computer system 2 and the first data link 13. In step 30, the first computer system 2, from which a workload shall be migrated to the second computer system 3, running a first main operating system is shut down. In a following step 31, the first computer system 2 is set up as a reader for the migration process. The first computer system 2 is restarted and booted from the first boot medium 11. By booting from the first boot medium 11, the first computer system 2 loads the first auxiliary operating system 16 into its main memory and starts executing the reader software 18, stored on the first boot medium 11.

In step 32, the first data link 13 is initiated by the reader for a first time. In order to do so, a network interface and a way of obtaining an IP address can be chosen. Also access information for the hub, such as a web address to access the third computer system 4 and the login data for the first computer system 2, described in step 20, can be entered. Every time, the first data link is set up, and data or information is sent, it is done via HTTP, emulating a normal interaction with a website, in particular emulating a so called "form submission by POST method". The POST method is not restricted regarding data length and data type of the uploaded data, which is advantageously regarding the herein described method. The data length in POST, however, may be restricted by settings on the web server, on which the hub is implemented. In some hosting spaces, the maximum data length can be quite low, for example 2 to 4 Megabytes. In most cases, such a limit can be raised using PHP commands issued directly from the hub backend, without asking for permission from an administrator of the hosting space. Whenever possible, the hub tries to raise this limit to accommodate for a needed block size, and if raising is disabled by the administrator of the hosting space, the user has to choose a smaller block size. Alternatively, also HTTPS and a communication via port 443 may be used, however, since in this embodiment, the data blocks uploaded by HTTP are encrypted, the data security level of this method is equal to or even better than using HTTPS. Using HTTP enables easier network access and HTTPS headers may become corrupted or stripped out after going through proxy servers and/or firewalls configured in a certain way, which may result in interrupted communications or an inability to reach the hub.

A request is sent from the reader to the hub, to authenticate the reader. A message is sent from the reader to the hub via the first data link 13, comprising plaintext login and a part, which is encrypted by a key which is cryptographically derived from the previously input password for the reader, created in step 20. The password is not sent from the reader to the hub. As mentioned regarding FIG. 1, the first data link 13 is stateless. Therefore, after the request for authentication was sent, the first data link 13 is not sustained. Each time, a communication is conducted through the first data link 13 in the following migration process, the first computer system 2 must prove its right of access to the hub as described above. If it should be suspected that an attacker obtained the password and is trying to interfere with the migrated data, the password only needs to be changed in the web GUI. The data link of the attacker will become invalid immediately. The password then can be updated in the reader software (or writer software) and the migration will immediately resume. In a step 33, the hub authenticates the reader. When the hub receives the message, sent by the first computer system 2, a login string is used to find the password corresponding to this login data in the hub's login/password database. The hub attempts to decrypt the message with a key, cryptographically derived from that found password. The key derivation algorithm is the same as the one, used on the reader's (or writer's) side. The message contains 2 types of proof information which becomes visible after decryption attempt. Based on these proofs, the hub can determine if the decryption was successful.

The proof information will compute correctly, only if the password known to the hub is the same as the password used by the reader for this particular message. If proofs fail, then the message is simply discarded, no matter if failure was caused by unintentional mistake or by malicious intent or even by transmission corruption, such as a network's fault. The message is trusted only based on computation of cryptographically strong proof, which is infeasible to reverse-engineer or attack by brute-force.

Figure 4:
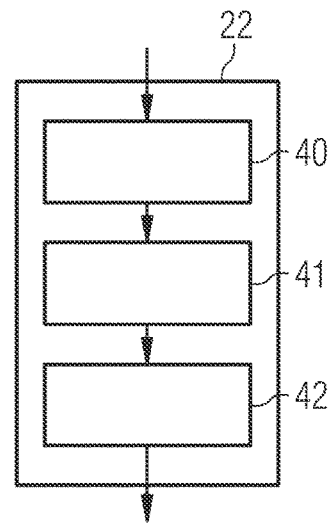

FIG. 4 is a flowchart of setting up the second computer system 3 as a writer and the second data link 14. Steps 40 to 42 may be performed before, after or in parallel to steps 30 to 33 of FIG. 3. In step 40, the second computer system 3 is booted from the second boot medium 12. The second computer system 3 loads the second auxiliary operating system 17 into its main memory and starts executing the writer software 19, stored on the second boot medium 12. In step 41, the second data link 14 between the second computer system 3 and the third computer system 4 is set up for a first time. In step 42, the writer is authenticated by the hub. Steps 41 and 42 are performed analogously to steps 32 and 33 of FIG. 3.

FIG. 5 is a flowchart, explaining in detail step 25 of FIG. 2, wherein the first computer system 2 reads the workload to be migrated into data blocks 15 on block device level and processes those data blocks 15.

In this embodiment, in step 50, a compression test is performed. The compression test, however, is optional. The compression test may be skipped, for example, if network traffic shaping is not important. Time may be saved by not performing the compression test. However, performing the compression test may save even more time during the migration process by performing the migration process based on a strategy, gained from the compression test. The reader reads the chosen workload from the first storage device 5 on a block device level. The reader divides the chosen workload, which is read from the first storage device 5, while reading into data blocks 15 of the previously chosen data block size. The data blocks 15 are loaded into the main memory of the first computer system 2, compressed and then discarded from the main memory without uploading them to minimize main memory consumption. During this compression test, the reader creates a compressibility map, comprising information about empty data blocks of the workload and information about how good compression can be achieved for each non-empty data block 15. The compressibility map is then sent from the reader to the hub. The compressibility map, for example, is a text file, similar to a comma-separated values, CSV, file, comprising entries regarding a block number, block size in bytes, whether it is an empty block and, if not, a compression ratio for each data block 15. The compression ratio, in this embodiment, is a fractional number between 0.0 and 1.0, with varying number of decimal places. A value of 1.0 resembles no compression, a value close to 0.0 resembles a very good compression.

In rare cases data can be so badly compressible that the rate will show a number greater than 1.0, e.g. 1.02. Such information is also valuable as all data blocks 15 with bad enough compressibility will simply be migrated without compression. Usually bad compressibility causes slow, CPU-heavy compression. Generally, a compression ratio higher than 0.9-0.95 can be considered as bad compressibility. CPU time can be saved during the migration process by selectively omitting compression of such data blocks 15 when the data blocks 15 are actually migrated.

The hub requests, in step 51, one data block 15 from the first computer system 2. As mentioned regarding FIG. 2, steps 25 to 27 of FIG. 2 are repeated. During this repeating process, optional step 50 is obviously omitted and after step 27 is completed but the migration process has not been completed yet, the process resumes with step 51. In this embodiment, the request is based on the information of the compressibility map, as described later. In order to receive the request from the hub, the reader still continuously requests instructions from the hub as described above by setting up a first data link 13 every time the reader requests instructions from the hub. In step 52, the reader reads the requested data block 15 from the first storage device 5 on block device level as explained in detail with regard to FIG. 1.

In step 53, the requested data block 15 is loaded into the main memory of the first computer system 2 to compress and encrypt the requested data block 15. Loading the data block 15 into the main memory causes an upper limit for the choosable data block size. No data blocks 15 larger than the size of the available main memory can be handled. In order to ensure a stable migration process, it may be advantageous to use for data blocks 15 of a smaller data block size a first computer system 2 with main memory with a capacity of at least eightfold the size of the data block size. For bigger data block sizes, a capacity of the main memory of the first computer system 2 threefold the size of the data block size may suffice. Those differences are caused by the auxiliary operating system, in this embodiment a Linux system, taking up RAM for its operation. With a small data block size, the share of the operating system taking up RAM is more prominent. For example, when using a data block size of 32 Megabytes, a capacity of main memory of 256 Megabytes of RAM is needed in this embodiment. Software for implementing the encryption process is comprised in the reader software 18. A key for encryption is input by a user of the first computer system 2, for example while setting up the reader, and stored in a volatile memory of the first computer system 2. This key for encryption, however, is not the same as the key, cryptographically derived from the input password, as described with respect to FIG. 3. The key, cryptographically derived from the input password is used for authentication with the hub and encryption of the headers. The herein described key for encryption is used for protection of the data blocks 15. Alternatively it would be possible, to store a key for encryption on the first boot medium 12. However, the key is not sent to the hub or any other computer system.

Figure 6:
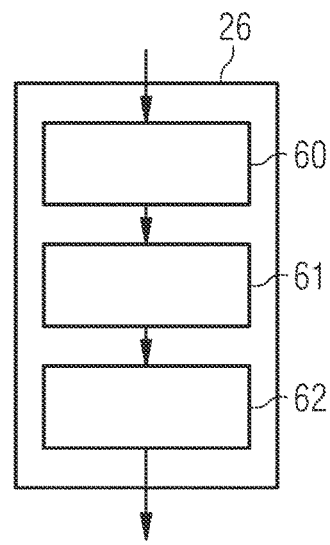

FIG. 6 is a flowchart, describing step 26 of FIG. 2 in more detail. In step 60, the compressed and encrypted data block 15 is uploaded from the reader to the hub. The compressed and encrypted data block 15 is combined with a header as described with respect to FIG. 1, forming data 150 corresponding to said data block 15. Uploading the data 150 to the hub therefore resembles a normal web page access from the reader to the hub. In order to do so, another first data link 13 is set up between the reader and the hub. In this embodiment, uploading the data 150 is done as in detail explained above by emulating the "form submission by POST method".

In step 61, the data 150 received by the hub is published, i.e. made available for download by the hub. The hub does not modify the data 150 in any way in this embodiment. However, in an alternative embodiment, the data 150 may also be modified by the hub in various ways.

In step 62, after the data 150 is made available for download by the hub, the writer downloads the data 150. Downloading the data 150 from the hub by the writer is done analogously to uploading the data 150 from the reader to the hub. The writer continuously inquires instructions from the hub. Each inquiry is done by setting up a second data link 14 between the writer and the hub according to the "form submission by POST method". If the data 150 corresponding to data block 15 is available for download on the hub, the writer's inquiry will be answered with an instruction to download that data 150 corresponding to data block 15 from the hub. If however data 150 corresponding to several data blocks 15 is buffered on the volatile memory or non-volatile storage device 7 of the hub, the hub queues the data 150 corresponding to data blocks 15 in an order in which it shall be downloaded by the writer. In that case, the hub decides which of the data 150 corresponding to data blocks 15 is next in queue and instructs the writer to download said data 150. An order of such queue may for example be based on a compressibility map, if such a map was created in optional step 30. If no compressibility map was created, the workload may be processed as data blocks 15 in an order they appear on the first storage device 5.

Figure 7:
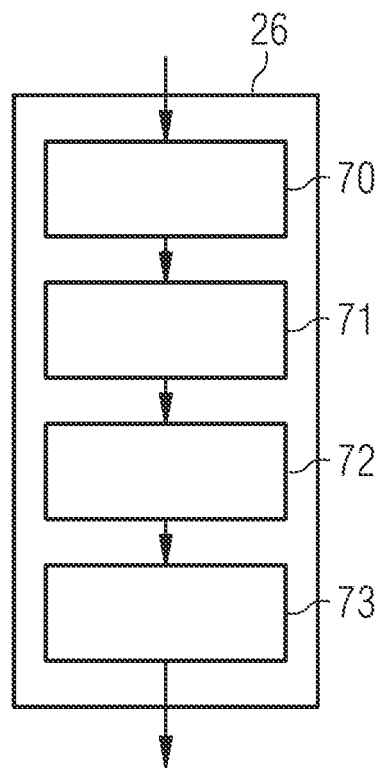

FIG. 7 is a flowchart, describing step 27 of FIG. 2 in more detail. In step 70, the writer decrypts and decompresses the downloaded data 150 corresponding to data block 15 in main memory of the second computer system 3. The capacity of main memory of the second computer system 3 correlates to the data block size in a similar way as described regarding the capacity of main memory of the first computer system 2 with respect to step 53. A key for decryption is input by a user of the second computer system 3, for example while setting up the writer, and stored in a volatile memory of the second computer system 3. Alternatively it would be possible, to store the key for decryption on the second boot medium 12. Software for implementing the decryption process is comprised in the writer software 19. In Step 71, the writer writes the data block 15 which was retrieved from the downloaded data 150 on the second storage device 6 on block device level, as explained in detail with regard to FIG. 1.

In a subsequent step 72, the writer performs a check, whether the data block 15 is safely written to the second storage device 6. Whether the data block 15 has been safely written or not is determined based on a re-read test: after the data block 15 is written to the second storage device 6, it is discarded from main memory of the second computer system 3. Only the fingerprint of the data block 15 is retained in the main memory. Subsequently, this data block 15 is read from the second storage device 6 into the main memory of the second computer system by the writer and a new fingerprint is computed. If the new fingerprint and the fingerprint, which remained in the main memory, match, the data block 15 is confirmed to be safely written. If the fingerprints do not match, the writer will go back to step 62 and re-download the same data block 15 from the hub. This process may be repeated until a safely writing of the data block 15 has been confirmed.

In a subsequent step 73, after the data block 15 is safely written to the second storage device 6, the writer submits a confirmation to the hub: "data block number X is confirmed!" The data block 15 is only deleted from the hub after the hub received the confirmation from the writer. The hub collects these confirmations to track a migration progress, to decide about which data block numbers to request from the reader next, and to calculate a prediction of migration time left until completion. The hub also decides depending on this information, whether the migration process was completed as described with respect to FIG. 2.

If due to any reason no network connection is available to perform the migration process, an offline migration may be performed. For offline migration, the method as described above is performed, but instead of uploading the data blocks 15 to the third computer system 4, the data blocks 15 are transferred to a temporary buffer. Such temporary buffer may be for example on an external storage device, connected to the first computer system 2 during the time when first auxiliary system 16 is running.

For example, the temporary buffer may be an external USB hard disk or USB memory-stick. Alternatively, the offline migration may also be done more intrusively, by adding an internal hard disk to the first computer system 2 by attaching cables (SATA, SAS, etc.) to a motherboard or a storage controller of the first computer system 2, by inserting the disk into a slot of a storage array of the first computer system 2, or in virtual environments by attaching a disk to a host machine and mapping it to the first computer system 2, which, in that case, is a guest in said host machine.

The temporary buffer then is physically transferred to the second computer system 3 and the data blocks 15 on the temporary buffer are written to the second storage device 6 of the second computer system 3. Writing the data blocks 15 to the second storage device 6 is done by setting up a connection between the temporary buffer and the second computer system 3 similarly to the connection previously set up between the first computer system 2 and the temporary buffer, as described above. Due to the division of the workload into data blocks 15, also workloads which are too big to fit into portable storage devices, such as external USB hard disks, USB-memory sticks or other portable storage devices, can be offline migrated by this method, for example by repeating the physical trip back and forth several times or by using multiple such portable storage devices at once.

The temporary buffer is the same type of buffer as in the hub, however, the buffer size, as described with respect to step 28 of FIG. 2, is set to the storage space size of the entire temporary buffer. Being the same buffer as in the hub, data secrecy is maintained during physical transfer of this temporary buffer. An encryption key is not stored anywhere besides the reader and the writer. If the temporary buffer is physically stolen, the data remains unreadable.

LIST OF REFERENCE SIGNS

1 computer arrangement
2 first computer system
3 second computer system
4 third computer system
5 first storage device
6 second storage device
7 third storage device
8 Internet
9 first firewall
10 second firewall
11 first boot medium
12 second boot medium
13 first data link
14 second data link
15 data block
150 data corresponding to data block
16 first auxiliary operating system
17 second auxiliary operating system
18 reader software
19 writer software
20 to 29 steps
30 to 33 steps
40 to 42 steps
50 to 53 steps
60 to 62 steps
70 to 73 steps

The invention claimed is:

1. Method for migrating a workload from a first computer system to a second computer system, the first and the second computer system being connected to a data network, the method comprising:
setting up a first data link via the data network from the first computer system to a third computer system and a second data link from the second computer system to the third computer system, wherein the first and the second data link are initiated by the first and the second computer system, respectively;
reading, by the first computer system, the workload to be migrated on a block device level from a first storage device of the first computer system;
dividing, by the first computer system, the workload to be migrated into a plurality of data blocks of a predefined size;
sequentially uploading, by the first computer system, data corresponding to the plurality of data blocks from the first computer system via the first data link to the third computer system;
downloading, by the second computer system, data corresponding to the plurality of data blocks from the third computer system to the second computer system via the second data link;
writing, by the second computer system, the plurality of data blocks to a second storage device of the second computer system, such that an identical copy of the workload to be migrated from the first computer system is created.

2. Method according to claim 1, wherein migrating the workload comprises copying partitions and/or disk images comprising data and/or an operating system and/or applications stored on the first storage device to the second storage device.

3. Method according to claim 1, the method further comprising:
requesting, by the third computer system, the plurality of data blocks from the first computer system before uploading data corresponding to said plurality of data blocks.

4. Method according to claim 1, the method further comprising:
instructing, by the third computer system, data corresponding to the plurality of data blocks to be downloaded by the second computer system before downloading said data, wherein the third computer system decides which data corresponding to said plurality of data blocks is to be downloaded next.

5. Method according to claim 1, the method further comprising:
booting the first computer system from a first boot medium, the first boot medium comprising a first auxiliary operating system and executable program code to set up the first data link, to read the workload to be migrated, to divide the workload into the plurality of data blocks and to sequentially upload data corresponding to the plurality of data blocks from the first computer system to the third computer system; and/or
booting the second computer system from a second boot medium, the second boot medium comprising a second auxiliary operating system and executable program code to set up the second data link, to download data corresponding to the plurality of data blocks from the third computer system to the second computer system and to write the plurality of data blocks on the second storage device.

6. Method according to claim 1, wherein the predefined size of the plurality of data blocks is determined based on a quality of the first data link and/or the second data link.

7. Method according to claim 1, wherein the predefined size of the plurality of data blocks is provided by a user.

8. Method according to claim 1, further comprising the steps of:
successively loading, by the first computer system, each data block of the plurality of data blocks of predefined size into main memory of the first computer system; and
compressing and/or encrypting, by the first computer system, each data block before uploading data corresponding to each data block.

9. Method according to claim 1, further comprising the steps of:
successively downloading, by the second computer system, data corresponding to each data block from the third computer system and loading said data into main memory of the second computer system; and
decrypting and/or decompressing, by the second computer system, the data corresponding to each data block before writing each data block to the second storage device.

10. Method according to claim 1, further comprising the step of:
creating, by the first computer system, a compressibility map of the workload to be migrated, wherein the compressibility map comprises information about a compressibility of each data block and/or information about where empty data blocks are located in the workload and an order of uploading data corresponding to the plurality of data blocks is determined by said compressibility map.

11. Method according to claim 1, the method further comprising the step of:
intermediately storing data corresponding to the plurality of data blocks on a non-volatile third storage device of the third computer system before downloading data corresponding to the data blocks by the second computer system.

12. Method according to claim 1, wherein the workload is migrated from the first computer system to the second computer system without intermediately storing data corresponding to the data blocks on a non-volatile third storage device of the third computer system.

13. Method according to claim 1, wherein, if the workload to be migrated is modified on the first computer system during migration, the method comprises the step of:
re-uploading data corresponding to data blocks of the plurality of data blocks whose source data on the first computer system were exposed to modification.

14. Computer arrangement comprising a first computer system, a second computer system and a third computer system, the first computer system, the second computer system and the third computer system being connected to a data network,
the first computer system being arranged to
set up a first data link via the data network to the third computer system;
read a workload to be migrated on a block device level from a first storage device of the first computer system;
divide the workload to be migrated into a plurality of data blocks of a predefined size;
sequentially upload data corresponding to the plurality of data blocks from the first computer system via the first data link to the third computer system;
the second computer system being arranged to
set up a second data link via the data network to the third computer system;
download data corresponding to the plurality of data blocks from the third computer system via the second data link;
write the plurality of data blocks to a second storage device of the second computer system such that an identical copy of the workload to be migrated from the first computer system is created.

15. Computer arrangement according to claim 14, wherein the third computer system is a web server processing requests received from the first computer system and the second computer system via hypertext transfer protocol, HTTP, and the third computer system listens on port 80 for requests sent by the first computer system and the second computer system.

16. Computer arrangement according to claim 14, wherein the first computer system is located in a first local area network, the second computer system is located in a second local area network and the third computer system is located in a wide area network, in particular the Internet, and the first and the second local area network is each connected to the wide area network.

17. A non-volatile storage medium comprising computer program code, which, when executed by at least one processing device of at least one of the first computer system, the second computer system or the third computer system, performs the steps of the method in accordance with claim 1 performed by the first computer system, the second computer system or the third computer system, respectively.

* * * * *